May 21, 1940.  W. M. BARRET  2,201,256

ELECTRICAL APPARATUS AND METHOD FOR LOCATING MINERALS

Filed Jan. 31, 1938   7 Sheets-Sheet 1

Inventor.
WILLIAM M. BARRET
A. F. Flournoy
ATTORNEY

FIG. 3  FIG. 4

Inventor
WILLIAM M. BARRET
By A. F. Flournoy
Attorney

May 21, 1940. W. M. BARRET 2,201,256
ELECTRICAL APPARATUS AND METHOD FOR LOCATING MINERALS
Filed Jan. 31, 1938 7 Sheets-Sheet 5

Inventor
WILLIAM M. BARRET
By A. F. Flournoy
Attorney

May 21, 1940.  W. M. BARRET  2,201,256

ELECTRICAL APPARATUS AND METHOD FOR LOCATING MINERALS

Filed Jan. 31, 1938  7 Sheets-Sheet 6

Inventor
WILLIAM M. BARRET
By A. F. Flournoy
Attorney

Patented May 21, 1940

2,201,256

UNITED STATES PATENT OFFICE 2,201,256

ELECTRICAL APPARATUS AND METHOD FOR LOCATING MINERALS

William M. Barret, Shreveport, La., assignor to Engineering Research Corporation, Shreveport, La.

Application January 31, 1938, Serial No. 187,788

11 Claims. (Cl. 175—182)

This invention relates to electrical prospecting apparatus, and to methods of utilizing the same. More particularly, the herein disclosed prospecting system makes use of electromagnetic waves, whereby useful subsurface information is acquired which could not be obtained with previous systems.

On December 29, 1936, William M. Barret and Randolph H. Mayer were granted United States Letters Patent No. 2,066,135, which disclosed portable electrical apparatus for locating bodies characterized by anomalous electrical admittances, such as pipe lines, conduits, and metallic treasure. Extensive researches with the apparatus finally led to instrumental developments and methods of operation which eventuated in a technique adapted to the solution of a number of important mining problems, and it is the purpose of the present case to disclose and claim those new elements possessing patentability.

One of the objects of this invention is to provide practical and reliable apparatus and methods for locating and determining the concentration and extent of placer deposits having anomalous electrical admittances.

Another object of this invention is to furnish an effective technique for determining the depth and configuration of the bed-rock which ordinarily underlies placer deposits.

Another object of this invention is to make available a satisfactory system for locating and defining mineralized veins whose electrical admittances differ from that of the surrounding media.

A further object is to provide a useful means of locating and mapping electrical discontinuities in buried strata, such as occur when a fault plane or dike is present, or when a body of ore is encountered whose electrical properties differ sufficiently from that of the surrounding material.

An additional object is to provide apparatus and methods for determining other useful geologic information for which the invention is adapted.

In the geophysical art it is a well understood fact that the flow through the earth of electric currents, and the propagation through the earth of electromagnetic waves, are notably influenced by the electrical conductivity, dieleceric constant, and magnetic susceptibility of the involved media. Various systems have been proposed for utilizing the changes which occur in these geo-electrical constants, in order to determine the geologic structure of an area, or to locate mineral deposits. As usually practiced, the former systems make use of direct current, interrupted direct current, commutated direct current, low frequency alternating current, and alternating current of moderately high frequency. The direct-current (and some alternating-current) systems involve two or more electrodes which are driven into the earth according to various patterns of spread and orientation. And the alternating-current systems ordinarily employ a generator of electromagnetic waves, which in the course of operation is spaced apart from and variously disposed with respect to a receiver of electromagnetic waves.

The direct-current systems customarily lead to determinations of voltages, currents, or the apparent resistivity of an earth volume bounded by spaced electrodes, while the alternating-current systems usually result in the determination of angular functions of the elliptically polarized field observed at the receiving apparatus, or the determination of the direction of propagation of the resultant field at selected points. The frequencies involved in the alternating-current systems have rarely exceeded 50 kilocycles (50,000 cycles per second).

In surveying an area with those systems employing grounded electrodes, it is necessary to move the electrodes from one point of observation to another, and oftentimes it is required that the spread and pattern of the electrodes be varied. Moreover, with the alternating-current systems the mutual orientation between the generator and receiver is altered at each observation point. The necessity of changing the electrodes from station to station, and of changing the mutual relation between the generator and receiver at successive stations, introduces variations in the electrical observations which frequently obscure their true geologic significance. The unavoidable complications arising from these sources are completely overcome with the present invention, which utilizes essentially rigid apparatus whose components retain the same mutual orientation at each point of observation. By keeping all instrumental constants at predetermined values, the readings obtained with the apparatus embodied in this invention are quantitatively related to the electrical properties of the earth volume investigated, and the problem of interpreting the electrical observations in terms of underground conditions is notably simpler than with former systems. And this simplicity of observation and interpretation is accompanied by apparatus which is far more compact and portable than that employed with the earlier systems; which is more rapid in use, and which requires a smaller field personnel for its operation.

This invention makes use of a modulated high-frequency generator of electromagnetic waves, a sensitive receiver of these waves, means of maintaining a particular alignment between the generator and receiver, and means of manually transporting the apparatus from place to place. In operation, the electromagnetic field arising at the generator penetrates the earth and envelopes any electrically anomalous mass lying within the range of the generator field, thus giving rise to an additional field which reacts on the receiver and causes a galvanometer pointer to deflect. An increase or decrease in the admittance of the earth beneath the apparatus will result in a corresponding change in the galvanometer deflection. By taking a number of observations of the galvanometer reading at important points within a given area, the methods disclosed herein make it possible to analyze and interpret the readings in such a manner that their geologic significance is determined, and much useful information concerning underground conditions is obtained thereby.

Figure 1:
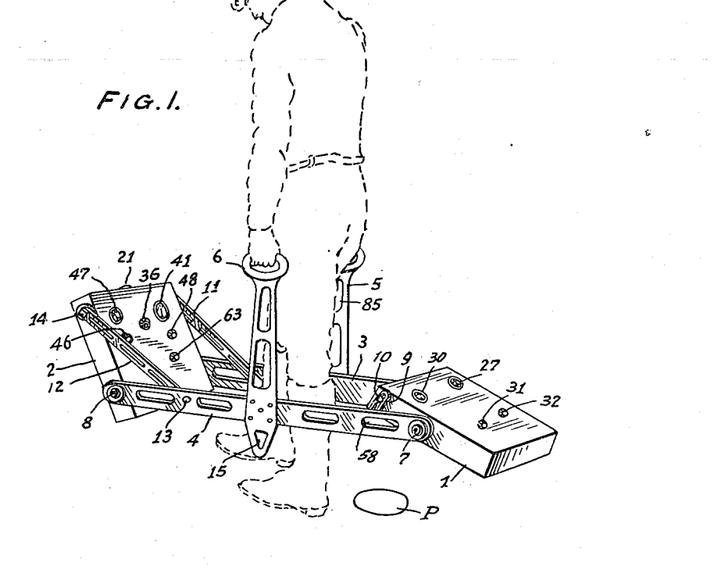
Fig. 1 illustrates a perspective view of the preferred form of apparatus in operation.

Referring to Fig. 1 by numerals, 1 is the oscillator, 2 is the detector, 3 and 4 are supporting arms to which are attached the carrying handles 5 and 6, 7 and 8 are clamping means for attaching the supporting arms 3 and 4 to the oscillator and detector, respectively, 9 are arc-shaped slotted brackets attached to the supporting arms, and 10 are clamping means for adjusting and maintaining the angularity of the oscillator 1, 11 and 12 are braces which are attached at one extremity to the supporting arms 3 and 4 by the clamping means 13 and at their other extremity are attached to the detector 2 by the clamping means 14, and 15 are lower extensions of the carrying handles 5 and 6 which act as supports for the apparatus when it is not in use.

Figure 2:
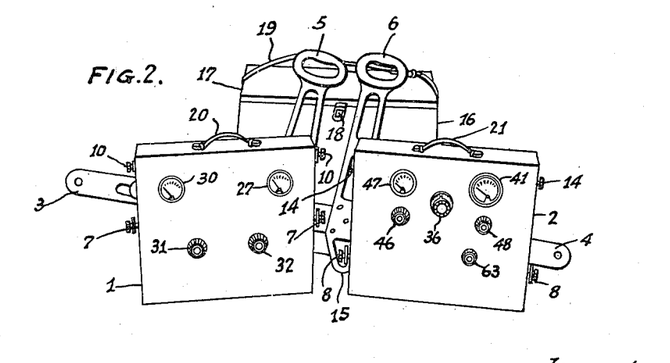
Fig. 2 shows the preferred form of apparatus dismantled for transportation.

The apparatus is shown dismantled for transportation in Fig. 2. Here 16 denotes a case which is provided with the hinged top 17, lock 18 and strap handle 19. The case 16 is designed to accommodate the oscillator 1 and detector 2, which may be placed therein by means of the handles 20 and 21, respectively. When this is done the case 16 protects those parts of the apparatus that might be damaged while moving from one area to another.

The electric circuits of the oscillator and detector units confrom essentially with conventional radio practice, and will receive but brief mention.

Figure 3:
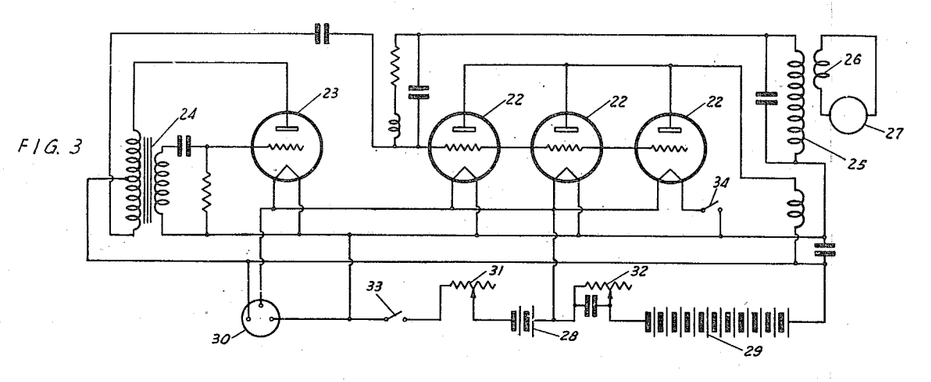
Fig. 3 is a circuit diagram of the preferred form of generator, or oscillator.

In Fig. 3 is illustrated the circuit diagram of the oscillator unit. This unit comprises a high-frequency oscillator which is modulated by a low-frequency oscillator. The high-frequency section consists of the vacuum tubes 22 and associated components, and the low-frequency section includes the vacuum tube 23, iron-core transformer 24, and associated components. It has been found successful in practice to utilize a high-frequency oscillator of 75 kilocycles, modulated by a low-frequency oscillator of 1 kilocycle, however, neither of these frequencies is critical, and substantially the same results can be secured over a fairly wide range in frequencies. The modulated high-frequency oscillations appear in the loop 25, to which is inductively coupled, by means of the coil 26, the current indicating device 27. It will be understood that the indicating device 27 might also be connected to the loop 25 by either conductive or capacitive means, but the inductive coupling shown in Fig. 3 is the preferred form. Power is derived from the filament battery 28 and plate battery 29. The dual-range voltmeter 30 is so arranged that the voltage applied to either the filaments or plates of the tubes may be read, and the rheostats 31 and 32 allow these respective voltages to be set and maintained at predetermined values. The switch 33 controls the filament current and the switch 34 breaks the filament line to one of the radio-frequency tubes 22 when operating the oscillator unit at reduced output.

Figure 4:
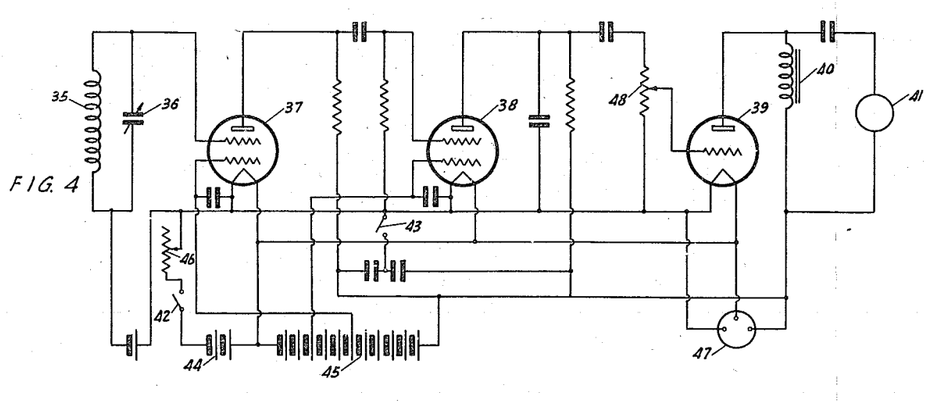
Fig. 4 is a circuit diagram of the preferred form of receiver, or detector.

The circuits of the detector unit are shown in Fig. 4. This unit is made up of the tuned loop 35 and variable condenser 36, connected to the input terminals of the radio-frequency amplifier tube 37, the output of which is fed into the demodulator 38, and thence into a 1-stage resistance-capacitance coupled audio amplifier which includes the tube 39. The final output of the detector appears in the choke 40 and is measured by the current indicating meter 41, which may be a rectifier-type galvanometer. The detector unit is energized by closing the mechanically interlocking switches 42 and 43, thus connecting the filament and plate batteries 44 and 45 respectively. The filament voltage is controlled by the rheostat 46, which is combined with the switches 42 and 43. The filament and plate voltages may be measured by the dual-range voltmeter 47. The overall gain of the detector unit is adjusted by means of the potentiometer 48, which controls the potential applied to the grid of the output tube 39.

The description of preferred forms of the oscillator and detector embodied in this invention now is complete. These forms comprise a modulated radio-frequency oscillator and a sensitive detector designed to receive and amplify the modulated waves generated by the oscillator. The specification and drawings dealing with the oscillator and detector are to be regarded as illustrative and not restrictive, for it is obvious to those versed in the art that optional forms of oscillators and detectors may be utilized to carry out the purpose of this invention. For example, an oscillator might be used which generated unmodulated electromagnetic waves, and the detector for use therewith could be of ordinary and conventional design, involving either a radio-frequency receiver and amplifier, or a heterodyne oscillator and audio-frequency amplifier. These optional forms are well understood by those familiar with the radio art, and need no further description.

The circuit components shown in Fig. 3 are contained in the oscillator case denoted 1 in Figs. 1 and 2, and the circuit components of Fig. 4 are contained in the detector case designated 2 in Figs. 1 and 2. Like meters and controls in Figs. 3 and 4 are denoted by like numerals in Figs. 1 and 2.

Having described the principal elements embodied in this invention, let us next consider its operation. When in use the apparatus is assembled as shown in Fig. 1. The oscillator and detector are energized by connecting their respective power sources, and their power level and amplification constant, respectively, are adjusted to the required values. The angularity of the oscillator next is set to give approximately midscale reading on the detector galvanometer 41, after which the apparatus is ready for use. If the operator now grasps the carrying handles 5 and 6 (Fig. 1) and moves the apparatus from point to point on the ground surface, then the galvanometer pointer will depart from its initial midscale position if the apparatus passes over any electrically anomalous mass which lies within the range of the apparatus. There follows an explanation of this effect.

Suppose the apparatus is initially adjusted for midscale galvanometer deflection over electrically homogeneous earth of very low admittance. The detector excitation then is due entirely to the energy transferred directly from the oscillator, or to what may be termed the primary field. This energy resides principally in the induction component of the primary field, because with the frequency used the separation between the oscillator and detector is so small that the radiation component of the field is of little consequence.

Now suppose the apparatus is moved to a point directly above a buried metallic body. The primary field generated by the oscillator then will induce an oscillating current in the conductive body, which current will in turn give rise to an electromagnetic field of the same frequency as the primary field. The induced field is called the secondary field. It induces an alternating voltage in the detector loop 35 (Fig. 4), thus causing a current to flow in the detector circuits which finally appears in the reading of the galvanometer 41. The actual reading of the galvanometer will be due to the combined effect of the currents resulting from the primary field and the secondary field, or to the vector resultant of what may be called the primary and secondary currents. The magnitude of the resultant current will depend on the respective values of the primary and secondary currents, and on their phase relation. Since the magnitude of the primary current remains approximately the same under all conditions, it follows that the reading of the detector galvanometer will vary in some manner with the secondary current.

It will be found that the value of the secondary current depends on the resistance, inductance and capacitance of the excited portion of the electrically disturbing body, that is, on its impedance. The secondary current will be inversely proportional to the impedance of the body, or directly proportional to its admittance. Also, the power factor of the disturbing body, or the phase angle between the E. M. F. induced in the body by the oscillator field and the current flowing in the body, determines the phase angle between the primary and secondary currents induced in the detector loop, and consequently influences the reading of the detector galvanometer.

If vector diagrams are constructed to show the relations between the voltage, current, flux and phase angle for the oscillator loop, the detector loop, and the disturbing body (which for present purposes may be a simple coil of wire, so arranged that its circuit characteristics may be altered by external resistors, inductors and capacitors), it will be found that: (1) when the circuit is predominantly resistive, the primary and secondary currents appearing at the detector galvanometer are almost at right angles, or are approximately 90 degrees out of phase; (2) when the coil circuit is predominantly inductive, the primary and secondary currents are almost directly subtractive, or are approximately 180 degrees out of phase, and (3) when the coil circuit is predominantly capacitive, the primary and secondary currents are almost directly additive, or are approximately in phase.

From what has been said it will be seen that the admittance and power factor of the coil circuit, or of any other disturbing body, have very definite effects on the reading of the detector galvanometer. However, if the galvanometer reading is to be correlated with the electrical characteristics of specific underground conditions, then it is apparent that no changes in the reading can be tolerated which are of instrumental origin. The most important factors to be considered in this connection are the power level of the oscillator and the amplification constant of the detector. Each must be kept substantially constant during a particular series of observations with the apparatus.

The power level of the oscillator, or the amount of electrical energy radiated by the oscillator loop 25 in Fig. 3, can be set at a predetermined value by means of the rheostat 32 and the radiation meter 27, which may be a thermocouple-type milliammeter. The power level can be considerably increased or decreased by cutting in or out one of the vacuum tubes 22 by means of the switch 34. In any event the power radiated by the oscillator can be maintained at any selected value by keeping constant the reading of the radiation meter 27. To accomplish this it will be found necessary to occasionally alter the setting of the rheostat 32, thereby decreasing its resistance as the oscillator circuits warm up in operation, and as the potential of the plate battery 29 declines from use.

The sensitivity of the apparatus determines the magnitude of the anomaly, or change in the detector galvanometer reading, which will be obtained when the apparatus is moved from "neutral" ground over a given disturbing object. Neutral ground here refers to earth which encloses no electrically anomalous mass. The overall sensitivity of the apparatus depends on both the oscillator power level and the detector amplification constant, and is represented by the "sensitivity factor." This factor is measured in either one of two ways, namely, by observing the anomaly when the apparatus is passed over a conductive object of known characteristics and placed at a known depth, or by placing a conductive loop (or other form of electric circuit) within the range of the apparatus and noting the anomaly when the loop is short circuited.

A convenient type of object for use in measuring the sensitivity factor is a thin metallic plate (for instance, P in Fig. 1), some five inches in diameter, which is placed on the ground where the apparatus may be carried over it at an arbitrary standard height. The difference between the galvanometer readings over the object and away from the object determines the sensitivity factor.

Figure 5:
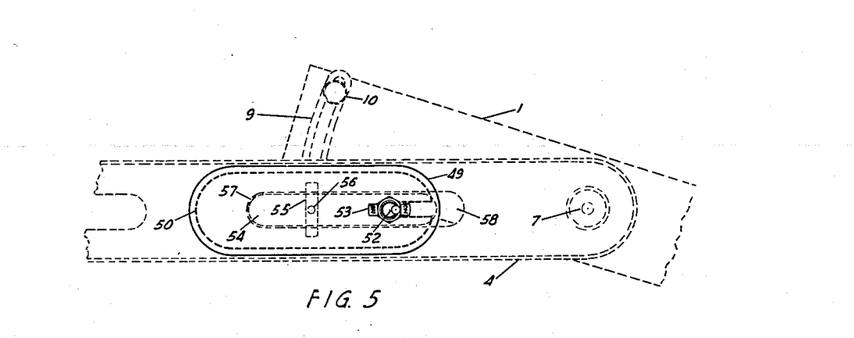
Fig. 5 is a front view of the preferred form of calibration coil, shown in the position in which it is used to measure the sensitivity of the apparatus.
Figure 6:
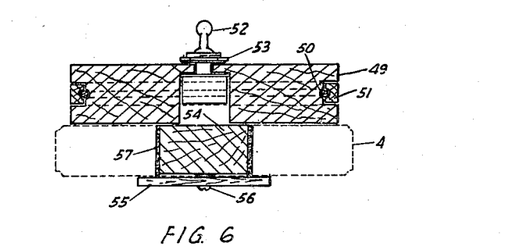
Fig. 6 is a sectional view of the preferred form of calibration coil appearing in Fig. 5.

The preferred form of calibration coil for measuring the sensitivity factor is shown in Figs. 5 and 6. It consists of a non-conductive body 49 whose periphery is grooved to receive the insulated wire 50, held in place and protected by the strip 51, and recessed to accommodate the toggle switch 52, which is provided with the "on" and "off" plate 53. To the back of the body 49 is fixed the block 54, to which is attached the latch 55 by the screw 56. The outside periphery of the block 54 is provided with the felt strip 57, which insures a snug fit between the supporting arm 4 and the block 54. The two ends of the wire 50 are attached to the two terminals of the switch 52, thus forming a closed conductive loop when the switch is in the "on" position, and an open loop when the switch is in the "off" position.

In operation, the block 54 is placed in the slot 58 of the supporting arm 4 with the switch 52 toward the oscillator 1, then moved in the direction of the detector 2 until the end of the slot 58 is reached, after which the latch 55 is used to secure the calibration-coil assembly to the supporting arm 4. Now, if the reading of the detector galvanometer 41 is observed with the switch 52 in the "on" position and in the "off" position, then the difference in the readings is a measure of the sensitivity of the apparatus. For example, if the galvanometer deflection is 200 microamperes when the switch is closed and 100 microamperes when the switch is open, the difference of 100 is taken to equal a sensitivity factor of 1.00. Had the difference in readings been 155 then the sensitivity factor would be 1.55. Here, and throughout this specification, it is assumed that the mutual orientation of the oscillator and detector is as shown in Fig. 1, which results in an increase in the galvanometer reading when the calibration-coil circuit is closed, or when the apparatus is passed over earth enclosing a mass of relatively high electrical admittance. By an alternative setting of the oscillator angularity, whereby the mutual inductance between the oscillator and detector loops is made the same as before but of opposite sense, it is possible to make the galvanometer reading decrease when a mass of high admittance is brought within the effective range of the apparatus, but this alternative setting of the oscillator is not considered in this specification.

In conducting a particular survey with the herein described apparatus, its sensitivity is measured at regular intervals, and the galvanometer reading obtained at each observation point is brought to a common sensitivity level by multiplying the observed reading by the reciprocal of the sensitivity factor. The corrections for variations in the sensitivity are made by plotting the sensitivity factors arrived at from the calibrations against the time the respective factors were obtained, and then using the curve drawn through the plotted values to determine the sensitivity factor applying to an observation taken at any intermediate time. As a rule no adjustments are made to the apparatus during a series of observations, and accordingly the sensitivity factor varies about linearly with time, especially after the battery potentials become stable and electric circuits have reached their normal operating temperatures.

A somewhat similar procedure is employed to compensate for the variations in the galvanometer reading occasioned by changes in battery potentials, temperature, slight frequency shifts, mechanical shocks encountered in operation, and other causes. These influences result usually in a gradual "drift" in the galvanometer deflection from time to time, which must be corrected for before the anomalies obtained with the apparatus can be truly assigned any geologic significance. The drift correction is found by taking the galvanometer reading, and determining the sensitivity factor, at regular intervals at the same observation point (or station), and after making the necessary sensitivity factor adjustments, finding the residual or drift correction needed to bring each reading to the value first observed. The drift corrections next are plotted against time and applied to the individual observations in the manner already explained for the sensitivity factor.

The final anomaly of a station is the algebraic difference between the corrected galvanometer reading obtained at the given station and that observed at some particular reference station, usually denoted the "base" station. The first observation of a series is usually made at the base station, and it is very helpful to have some means of setting the galvanometer reading to a predetermined value at this station. For instance, if the full scale deflection of the galvanometer is 250 microamperes, it is customary to adjust the reading at the base station to 100 microamperes, since this value is approximately the normal midscale deflection, and too, the even quantity simplifies the subsequent computations.

Figure 7:
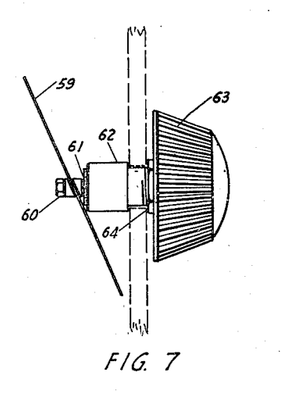
Fig. 7 is a side view of the preferred form of device used to vary the distribution of the electromagnetic field in the vicinity of the detector.
Figure 8:
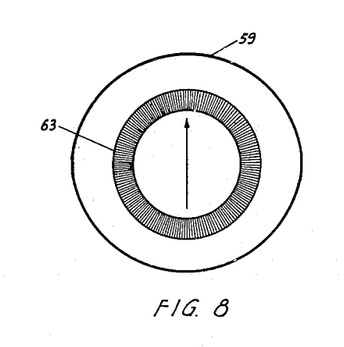
Fig. 8 is a front view of the preferred form of device shown in Fig. 7.

To obtain a deflection of precisely 100 microamperes by adjusting the angularity of the oscillator would be difficult and require considerable time. But the device shown in Figs. 7 and 8 overcomes this difficulty by making possible the close adjustment of the galvanometer pointer after a preliminary rough adjustment has been reached by setting the oscillator angularity. The device consists of the circular disc of electrically conductive material 59, attached at its center by the clamping means 60 to the shaft 61, which rotates in the bushing 62. The end of the shaft opposite the rotatable vane 59 is provided with the insulated knob 63, which permits varying the angular position of the vane 59. The bushing 62 is attached by the nut 64 to the detector panel in the position indicated in Figs. 1 and 2. Variations in the angular position of the metallic vane so alters the distribution of the electromagnetic field which links the detector loop that a wide range in the galvanometer deflection can be obtained with a complete rotation of the shaft 61. It furnishes a smooth, precise and rapid means of securing the desired reading of the galvanometer. The device shown in Figs. 7 and 8 represents the preferred means of varying the reading of the galvanometer 41 by distorting the flux linking the detector loop 35. It is evident, however, that other forms might be used to accomplish the same purpose, for example, a conductive plate so hinged that its movement would alter the distribution of flux in its neighborhood.

This concludes the description of the apparatus embodied in this invention, and it remains now to consider the methods disclosed herein to achieve the objects enumerated.

Figure 9:
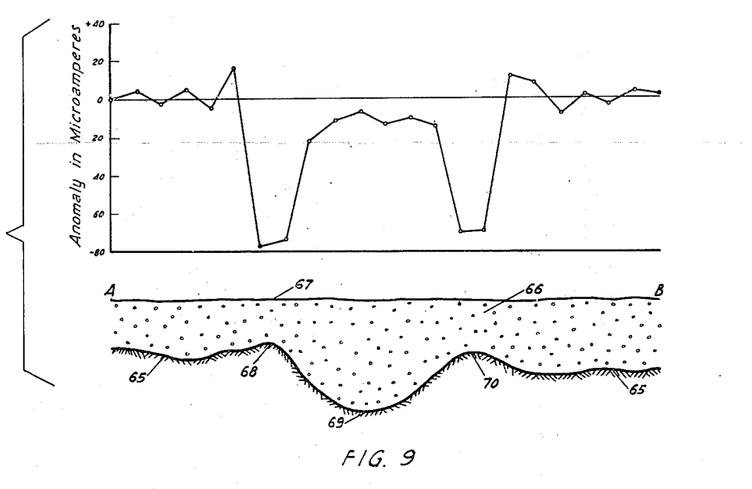
Fig. 9 is a sectional view of a buried bed-rock channel devoid of disseminated gold, and the electrical response curve obtained along a profile extending from A to B.

Reference will be made first to the application of the apparatus and methods to particular mining problems involving gold placer deposits, where its is important to locate buried channels in bed-rock, and to determine if the channels carry concentrations of disseminated gold. In Fig. 9 is shown a geologic cross-section comprising the bed-rock 65 and the overlying placer gravel 66, together with the plotted results of an electrical profile which extends in a straight line from A to B along the ground surface 67. The open circles of the electrical response curve represent the anomalies observed at the various stations, each circle being located vertically above its respective station. If the anomaly is positive, it means that the corrected galvanometer reading at the station in question is greater than at the base station chosen at the beginning point A, and if the anomaly is negative, the converse is true. The zero reference line is passed through the reading at the point A, whose anomaly is arbitrarily fixed at zero. The point A is presumed to lie over electrically neutral earth. It is observed that, in moving from A to B, the anomaly increases as the bed-rock channel shoulder 68 is approached, then falls sharply directly above the shoulder, increases again but does not reach the zero reference line as the channel 69 is traversed, falls rapidly again over the channel shoulder 70, rises slightly above the reference line after the shoulder is passed over, and thence returns to the zero reference line when the influence of the channel and shoulders disappears. The minor oscillations of the response curve about the reference line, in the vicinity of the points A and B, is typical of the curves obtained in actual practice, and usually are caused by the presence of boulders in the underground.

In connection with the example cited in the preceding paragraph, it is important to note that the presence of bed-rock channel shoulders is disclosed by negative electrical anomalies, or minima, directly above the respective shoulders, and that over the channel proper the response curve does not return to the zero reference line.

Exhaustive field tests have demonstrated that the essential characteristics of the anomaly displayed by the response curve of Fig. 9 are firmly identified with a buried bed-rock channel devoid of mineralization, and hence constitute a diagnostic indication of the presence and character of this type of geologic feature. The same may be said of the response curves appearing later in this specification in connection with Figs. 10, 16, and 17 (and for a number of cases not cited herein), where diagnostic anomalies are disclosed which indicate the presence and character of the several geologic features referred to in the figures.

Figure 10:
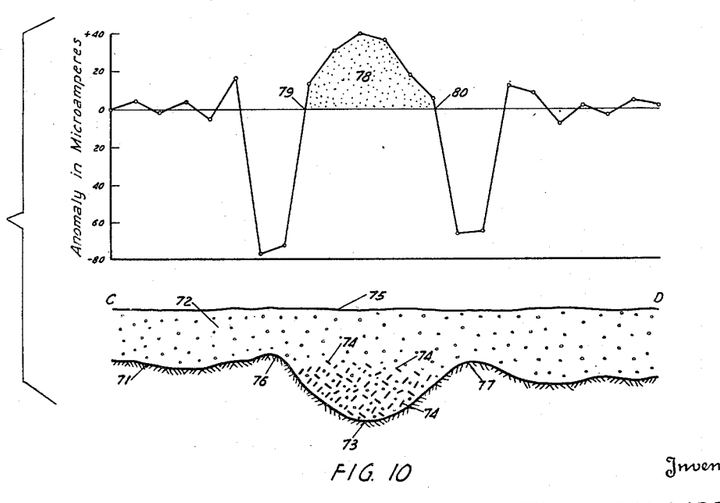
Fig. 10 is a sectional view of a buried bed-rock channel carrying a concentration of disseminated gold, and the electrical response curve obtained along a profile extending from C to D.

Consider now the effect caused by the presence of gold placer. In Fig. 10 the bed-rock 71 is overlain with the gravel 72 which encloses within the channel 73 the particles of gold 74. Along the earth surface 75 the apparatus is moved in a straight line from C to D, the galvanometer reading is observed at stations located an appropriate distance apart, say five or 10 feet, and the anomaly corresponding to each station is plotted in the graph directly above the respective station. It is seen that to each side of the channel 73, and in the immediate vicinity of the channel shoulders 76 and 77, the shape of the response curve is the same as in Fig. 9, but that over the channel proper, which carries the gold particles 74, the curve rises above the zero reference line and there is developed directly above the gold deposit the stippled area 78. If the gold deposit occurs outside of a well-defined bed-rock channel, such as a "bench" deposit, then the anomaly has the same general character, except that the minima disappear, due to the absence of channel shoulders.

It is known that, under comparable geologic conditions and with equal sensitivity factors, the mean ordinate of the area 78 may be correlated with the quantity of gold (usually expressed as the average value in cents per cubic yard) present in the channel (or other deposit) beneath the electrical profile.

When working in an unknown area, the bed-rock channels first are defined by means of response curves similar to that illustrated in Fig. 9. If positive anomalies occur over certain of the channels, as shown by the area 78 in Fig. 10, then it is known that these channels carry gold values beneath the respective profiles. The distribution of the gold deposit may be determined qualitatively by comparing the various electrical indications, the mean or average ordinate of the curve, between the points 79 and 80, increasing as the concentration of gold increases, and vice versa.

To determine the quantitative, or actual, gold values present it is necessary to prepare for each general area a "coupling curve," which is arrived at in the following manner. A number of response curves of the type shown in Fig. 10 are selected from representative portions of the area, and their mean ordinates are computed, care being exercised to see that the mean ordinates differ as much as possible in numerical value. Next, from beneath those portions of the selected curves corresponding to the positive envelope 78 in Fig. 10, a sufficient number of "bank run" samples (equal quantities of material from the surface to bed-rock) are obtained and assayed to find the average gold values present in the respective channels. A coupling curve similar to that shown in Fig. 11 will result when the various mean ordinates are plotted against their corresponding gold values. A curve of this type makes it possible to estimate within mining tolerances the average bank run gold values present beneath the remaining unsampled profiles of the survey.

Consider briefly the reason for the occurrence of a positive electrical anomaly, or maximum, over a deposit of disseminated gold. From what has gone before concerning the principle of operation of the herein apparatus, it is evident that the maximum is but a reflection of the presence of an underlying earth volume of relatively high admittance. Laboratory tests have demonstrated that the increase in admittance is due to the presence of the gold particles, which increase the electrical capacitance (or dielectric constant) of the enclosing volume. Gold placer ground may thus be regarded as a volume of increased electrical capacity, the condenser involved having a multitude of minute "plates" represented by the gold particles, and a "dielectric" represented by the country rock.

Figure 11:
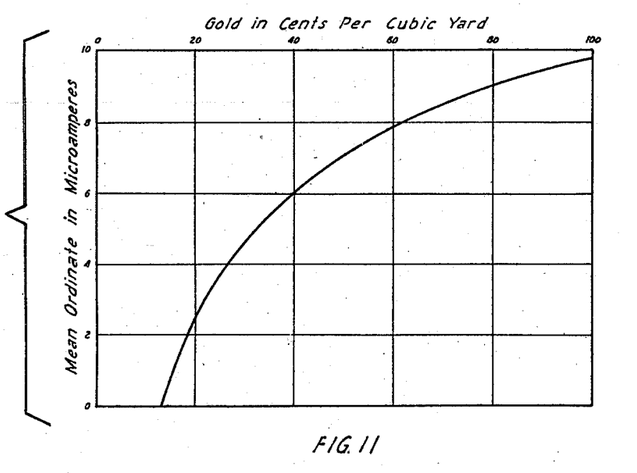
Fig. 11 is a graph showing the relation between the average unit quantity of gold present in a transverse channel section and the mean ordinate of the positive anomaly displayed by the response curve.
Figure 12:
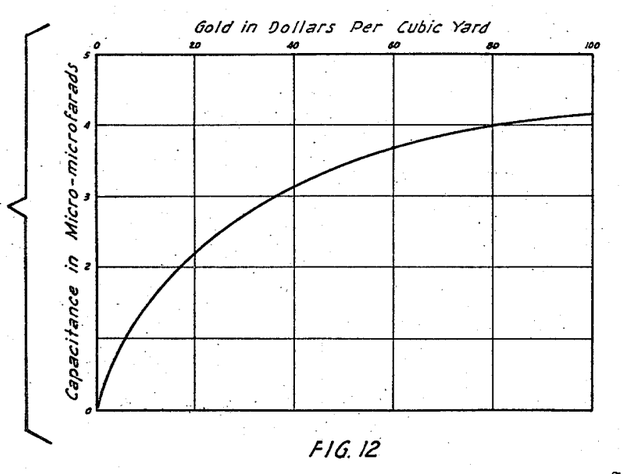
Fig. 12 is a graph showing the relation between the capacitance of a laboratory sample and the concentration of disseminated gold.

In Fig. 12 is illustrated a curve showing the relation between the capacitance and the quantity of gold for a synthetic laboratory sample whose volume was 83 cubic inches. The sample container was a glass cylinder provided with brass end plates which initially was filled with dry river sand. The plates were connected to the two terminals of a high-frequency (substitution-type) capacitance bridge whose vernier condenser was set at zero and the bridge brought to balance. The capacitance in micro-microfarads of the sample between the end plates then was measured by the vernier as known quantities of finely divided gold were mixed with the dry sand. The curve of Fig. 11 indicates the change in capacitance of the sample due to the introduction of the gold particles, whose quantity is expressed in dollars per cubic yard. The minor change in capacitance due to relatively large amounts of gold is due to the small size of the sample investigated, the volume of the sample measuring less than 1/60,000 of the earth volume effective under actual operating conditions.

It is instructive to note that the laboratory curve of Fig. 12 has the same general form as the curve of Fig. 11, which was constructed from data obtained under actual field conditions. Also, it is important to point out that within reasonable limits and for equal quantities of gold, the size of the gold particles, or conversely, the number of particles, has no large influence on the capacitance of the placer material, as changes in the number of particles are compensated by corresponding changes in the effective area of the individual particles.

In the preceding discussion it has been shown how the present invention is used to locate buried channels in bed-rock, to delimit those portions of the channels which carry concentrations of gold, and to compute the average gold values per cubic yard in the mineralized areas. Knowing the lateral extent of the deposits and their respective gold values per cubic yard, there remains the important problem of finding the vertical extent of the deposits, in order to arrive at the yardage available for mining operations. In mineralized areas, the gold usually occurs throughout the placer gravel, increasing in concentration from the surface to bed-rock, and therefore the problem resolves itself into finding at significant points the depth to bed-rock.

The relative depth to bed-rock may be ascertained frequently from an inspection of the electrical response curves, since a progressive rise or fall in the curve denotes a corresponding increase or decrease in the thickness of placer gravel, and hence a corresponding increase or decrease in the bed-rock depth. This is due to the fact that the admittance of the placer gravel is considerably higher than that of the bed-rock, and consequently an increase in the gravel section causes an increase in the positive amplitude of the response curve.

It is oftentimes required, however, to determine the actual depth of the bed-rock at specific locations. The preferred method of accomplishing this is described here. At a given location where the bed-rock depth is needed, the two uprights 81 (Figs. 13 and 14) are erected by placing their lower (black) portions 82 firmly in the earth, whose surface is denoted by 83. The cross-bar 84 then is passed through the slots (denoted 85 in Fig. 1) of the carrying handles 5 and 6, and its extremities placed on the pins 86, which first are set in the holes 87 of the uprights 81. In this position the longitudinal centerlines of the supporting arms 3 and 4 are exactly one foot above the ground surface 83. After the galvanometer reading is observed in this first position, the apparatus is raised one foot higher by changing the pins 86 to the holes 88, and a second observation of the galvanometer deflection is made. This operation is continued until the galvanometer reading has been obtained for the remaining pin positions 89, 90, 91 and 92, and the apparatus has been elevated to a height of six feet in increments of one foot.

Figure 13:
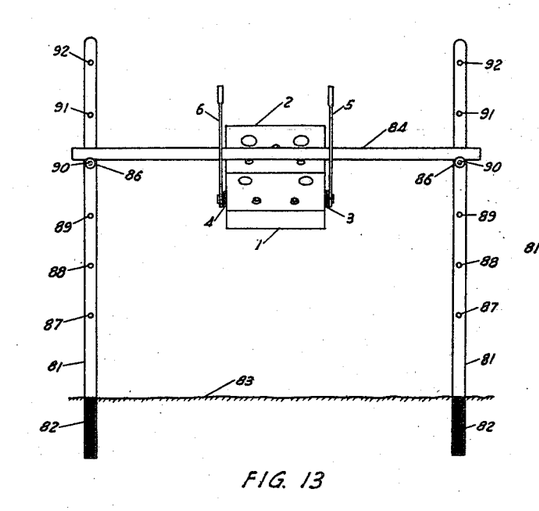
Fig. 13 is a front view of the preferred form of structure used to support the herein apparatus at various heights in determining the depth to bed-rock at a given location.
Figure 14:
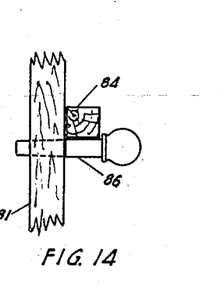
Fig. 14 is a side view of portions of the preferred form of structure shown in Fig. 13.

This procedure, which is termed a "depth determination", results in having the galvanometer readings with the apparatus elevated at six different heights above the ground surface 83. As corrections are applied to the readings to compensate for any changes which occur because of drift or varying sensitivity, and as the admittance of the earth volume present at the given location remains the same in each position of the apparatus, the data may be used to develop an equation expressing the relation between the galvanometer reading and the depth of the bed-rock below the ground surface.

Figure 15:
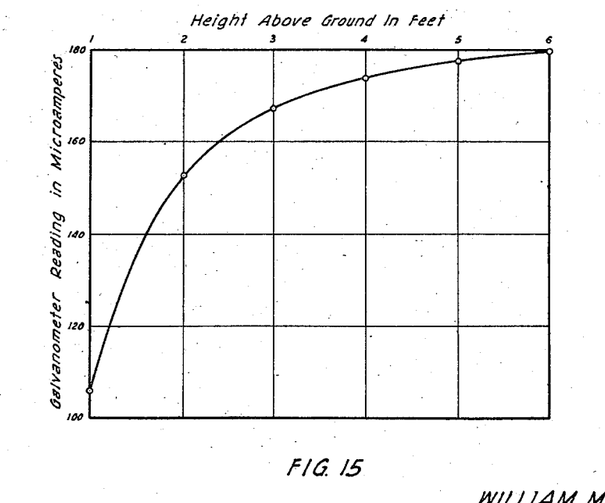
Fig. 15 is a graph showing the relation between the reading of the detector galvanometer and the height of the herein apparatus above the ground surface.

A plot of the equation expressing the relation between reading and height of apparatus above the ground surface (which is a function of the true depth to bed-rock) has the character of the curve shown in Fig. 15. The equation is of the hyperbolic form, $$R = a(D+h)^b + c \qquad (1)$$

where $R$ is the galvanometer reading; $D$ is the depth of the bed-rock below the ground surface; $h$ is the height of the apparatus above the ground suface; $c$ is the asymptote of the hyperbolic curve, and usually is taken equal to the galvanometer reading at the 6-foot height, and $a$ and $b$ are constants whose values depend on geologic and instrumental conditions.

The $R$ and $h$ values for the vertical heights 1, 2, 3 and 4 feet may be substituted in Equation 1 to obtain the four equations, $$R_1 = a(D+1)^b + c$$
$$R_2 = a(D+2)^b + c$$
$$R_3 = a(D+3)^b + c$$
$$R_4 = a(D+4)^b + c$$

which may be expressed in their logarithmic forms as follows, $$\log (R_1-c) = \log a + b \log (D+1) \quad (2)$$
$$\log (R_2-c) = \log a + b \log (D+2) \quad (3)$$
$$\log (R_3-c) = \log a + b \log (D+3) \quad (4)$$
$$\log (R_4-c) = \log a + b \log (D+4) \quad (5)$$

Subtracting (3) from (2), and subtracting (5) from (4), there results, $$\log (R_1-c) - \log (R_2-c) = b[\log (D+1) - \log (D+2)] \quad (6)$$

$$\log (R_3-c) - \log (R_4-c) = b[\log (D+3) - \log (D+4)] \quad (7)$$

Dividing (6) by (7) leads to the expression, $$\frac{\log (R_1-c) - \log (R_2-c)}{\log (R_3-c) - \log (R_4-c)} = \frac{\log (D+1) - \log (D+2)}{\log (D+3) - \log (D+4)} \quad (8)$$

or $$f(R) = f(D) \quad (9)$$

Next, $f(D)$ is evaluated for various values of $D$, and the values of $f(D)$ thus found are plotted against $D$.

For a particular series of observations, which have been obtained at a location where the depth to bed-rock D is required, the galvonometer readings for the heights 1, 2, 3 and 4 feet then are substituted in $f(R)$ of Equation 9, remembering that $c$ is taken equal to $R_6$, and the value of $f(R)$ determined for the series of observations selected.

Now, since the graph $f(D)$ and $D$ also represents the graph of $f(R)$ and $D$, it can be used to find the unknown value of D corresponding to the computed value of $f(R)$. The bed-rock depth at the given location is thus determined from the galvanometer readings observed at the same location.

Equation 8 is a general solution for finding the depth to bed-rock from the galvanometer readings obtained at five heights of the apparatus, namely, in the vertical positions 1, 2, 3, 4 and 6 feet. It is noted that by an obvious modification of the equation, the vertical positions 2, 3, 4, 5 and 6 might be used, and this is done when the "depth determination" is carried out over other than flat terrain, in order to minimize any "surface effect," which clearly would be emphasized in the lowest, or 1-foot, position. By proper substitutions in Equation 8, the R and D values can refer to any four vertical positions whose numerical values are less than the height at which $R_6=c$ is obtained. In fact, the general equation may be derived in such form that but three galvanometer readings are required in addition to the reading which represents $c$. It is preferred, however, to make use of a total of five observations, and to secure large differences in the galvanometer readings by increasing the sensitivity factor of the apparatus, as this procedure leads to more accurate determinations of the bedrock depths. But if the sensitivity factor is increased to very high values, then it becomes necessary to elevate the apparatus to a height of more than 6 feet in order to approximate the true value of the asymptote $c$.

It is to be understood that other forms of equations can be employed to determine the bedrock depth from the galvanometer readings obtained at different heights of the apparatus. Moreover, the solution of the other forms of equations will differ somewhat from the method outlined here. But in each case, the broad physical and mathematical principles involved are the same as utilized in the herein described method. From a practical viewpoint, the method disclosed here is characterized by inherent advantages, among which may be mentioned its general application without regard to geologic and instrumental factors, and the rapidity with which the method can be used in practice, resulting in a field crew being able to determine the bed-rock depth at a particular location within several minutes after the instrumental observations are completed.

The method described leads to a determination of the bed-rock depth at a given location, and by extending the operation to include a requisite number of such locations, it is easily possible to find the depth and configuration of the bedrock underlying any particular area. The bedrock configuration is best delineated by drawing contours which are based on the depth values.

The foregoing discussion has dealt with the bed-rock which ordinarily underlies placer deposits, but it is evident that the same procedure could be used to find the depth and topography of the bed-rock in other than placer areas, and in other than mining problems, for instance, in a number of construction problems, where it is important to know the depth of bed-rock in order properly to design the foundations of dams, bridges, and other structures. Moreover, it will be understood that the procedure is applicable to finding the depth of electrically anomalous discrete bodies which lie within the effective range of the apparatus, such as a vein, dike or ore pocket.

Figure 16:
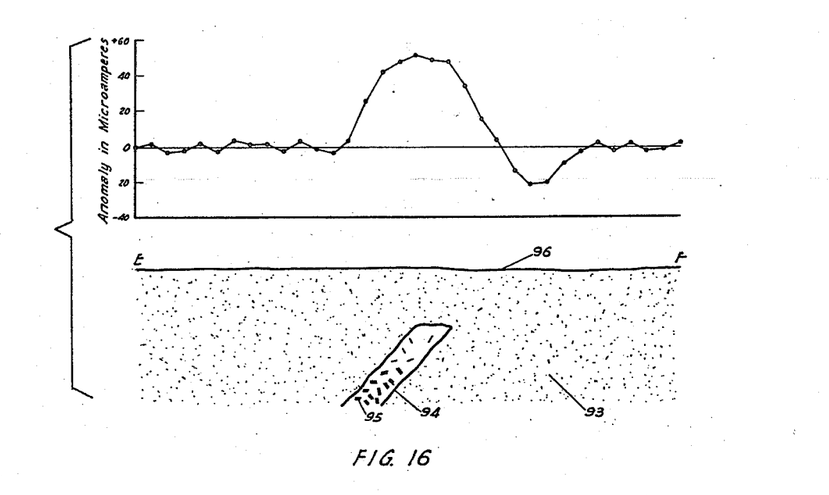
Fig. 16 is a sectional view of a buried mineralized vein, and the electrical response curve obtained along a profile extending from E to F.

The next application of the present invention to be considered is that involving the location of mineralized veins whose electrical properties distinguish them from the surrounding media. In Fig. 16 there appears a geologic cross-section comprising the formation 93, which encloses the quartz vein 94 and gold veinlets 95. If an electrical profile is run along the ground surface 96, from the point E to the point F, and the anomalies found at the various stations are plotted against their respective positions on the surface 96, then the resulting graph will have the appearance of the response curve shown in Fig. 16.

As the vein is approached, the anomalous values increase in positive amplitude, fall below the zero reference line immediately after the vein is passed over, and return to normal when the influence of the vein disappears. In other words, a pronounced maximum develops immediately above the mineralized vein, which is followed by a minimum of lesser magnitude. The amplitude of the maximum varies with the average admittance of the vein material and the surrounding media, the width of the vein, and the depth to the top of the vein. The width of the maximum is influenced by the variables enumerated, and by the angle of dip of the vein, the width increasing as the dip decreases. As the depth of the vein increases, the minimum disappears before the maximum.

In searching for a vein with the herein described invention, the electrical profiles are so arranged and oriented that their lines of traverse intersect at approximately right angles the strike of the suspected vein. When a vein indication is obtained on a particular traverse, a second profile is run along the same line of traverse, but in the opposite direction. The "peaks," or highest values, of the maxima shown by the two response curves, or observed directly from the galvanometer readings, usually will not coincide, but will be displaced somewhat along the line of traverse. However, a point midway between the two peaks will be located directly above the vein. The same operation is repeated for other profiles, until the strike and lateral extent of the vein is determined in detail. The depth of the vein at various points may be estimated from the displacement between the maxima found on profiles run in opposite directions along the same line of traverse, the linear displacement between the corresponding maxima increasing as the depth of the vein decreases.

Figure 17:
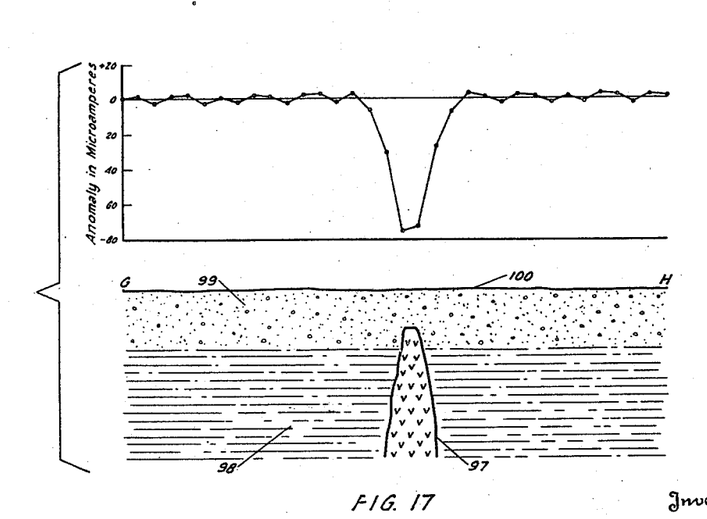
Fig. 17 is a sectional view of a buried igneous dike, and the electrical response curve obtained along a profile extending from G to H.

A case somewhat analogous to that of a mineralized vein is presented in Fig. 17. Here there appears a sectional view of the igneous dike 97, which has been intruded into the formations 98 and 99, but has not reached the earth surface 100. The electrical response curve obtained along a line of traverse extending from G to H shows that the dike causes a pronounced minimum, whose "trough" is located directly above the igneous mass 97. This type of anomaly is characteristic of many forms of dikes, which lie at other than shallow depths, and may be ascribed to the relatively low impedance of the dike materials as compared with the surrounding media. When the impedance of the dike differs greatly from that of the surrounding formations, and when the upper surface of the dike lies under a thin section of overburden, then the anomaly due to the presence of the dike is composed of a pronounced minimum, located approximately over the dike, which is preceded by a maximum of lesser magnitude. The maximum disappears before the minimum as the depth of the dike increases. In an electrical sense the high-impedance dike is the opposite of the low-impedance mineralized vein and, as might be expected, causes an anomaly of opposite characteristics.

While gold has been considered in the geologic applications cited thus far in these specifications, it should be understood that the present invention makes possible the detection of numerous other minerals whose electrical admittances differ from that of the surrounding media. Moreover, it must not be inferred that the geologic features considered herein constitute the only types of underground conditions that may be investigated with this invention, for it is known that the technique is applicable to the solution of many other important subsurface problems. For example, discontinuities in buried strata, both vertical and lateral, inclined fault planes, and numerous other geologic features, may be investigated successfully with the herein described invention. It is believed, however, that the cases enumerated are sufficient to demonstrate its mode of operation, and to suggest its scope of application.

Before concluding these specifications, it is desired to emphasize the fact that the apparatus and methods described herein have been used successfully in practical mining investigations. The technique was employed initially in a number of the gold placer districts of the State of New Mexico, and since that time extensive surveys, totaling some 20 crew-months, have been conducted in California, Arizona, Idaho, Nevada, Colorado and portions of Canada.

The underground problems involved in these surveys usually concerned placer and lode deposits of gold, although considerable attention was given to deposits of scheelite, molybdenite, cinnabar, stibnite, stibiconite, and auriferous pyrite containing galena and free gold. Successful surveys have been carried out over both desert and mountain gold placers, where the values ranged from a few cents to several dollars per cubic yard, and the bed-rock depths varied from a few inches to some 35 feet. Notable success has been attained in locating mineralized quartz veins, whose depths ranged from several feet to about 30 feet, and in mapping mineralized porphyry containing iron oxide and gold. Other features successfully delineated include dikes, faults and contacts.

The apparatus embodied in this invention is the result of almost eight years of research in the laboratory and field, and its present state of development was reached through the gradual evolution of numerous and various types and designs of electrical apparatus. The methods described herein are based largely on empirical solutions which were arrived at from analyzing the results obtained in many surveys over a wide variety of known geologic conditions. The efficacy and usefulness of the prospecting system disclosed are attested to by the results secured in conducting a large number of practical surveys in the areas enumerated, where the predictions based on the electrical data have been consistently confirmed by subsequent development work.

It is to be understood that the apparatus and methods disclosed herein are susceptible of various modifications without departing from the spirit or broad principles of the invention, and accordingly it is desired to claim all novelty inherent in the invention as broadly as the prior art permits.

What is claimed as new and useful is:

1. In an electromagnetic means for prospecting, an apparatus comprising a generator of electromagnetic waves, said generator being provided with an antenna, a means for maintaining substantially constant the energy radiated by said antenna, a meter associated with said antenna whereby said energy radiated by said antenna is indicated, said generator combined with a receiver of electromagnetic waves in a rigid structure, said receiver being provided with a meter, the reading of which is proportional to the radio-frequency input to said receiver.

2. In an electromagnetic means for prospecting, an apparatus comprising a generator of electromagnetic waves combined with a receiver of electromagnetic waves, a device comprising an electric circuit in combination with said generator-receiver, a means for opening or closing said electric circuit, whereby said opening or closing of said electric circuit produces a difference in reading of said receiver which is used as a measure of the sensitivity of said generator-receiver.

3. In an electromagnetic means for prospecting, an apparatus comprising a generator of electromagnetic waves combined with a receiver of electromagnetic waves and a device comprising an object having relatively high electrical admittance, whereby a difference in reading of said receiver when said generator-receiver is in the proximity of said object and removed therefrom is used as a measure of the sensitivity of said generator-receiver.

4. In an electromagnetic system of prospecting, an apparatus comprising a generator of electromagnetic waves, a receiver of electromagnetic waves and a standard high admittance circuit said receiver and said circuit being placed in the electromagnetic field of said generator, whereby the sensitivity of said apparatus may be determined.

5. In an electromagnetic means for prospecting, an apparatus comprising a generator of electromagnetic waves combined with a receiver of electromagnetic waves, a device comprising an electric circuit in combination with said generator and said receiver and a means for changing said electric circuit, whereby a change of said electric circuit produces a difference in reading of said receiver which is used as a measure of the sensitivity of the generator-receiver combination.

6. In an electromagnetic means of prospecting, an apparatus comprising a generator of electromagnetic waves combined with a receiver of electromagnetic waves, a device comprising a movable electrically conductive object, whereby a movement of said electrically conductive object alters the distribution of the electromagnetic field in the vicinity of said generator or said receiver and thereby causes a change in the output of said receiver.

7. The method of determining the location and character of placer deposits, mineralized veins, or other bodies identified by anomalous electrical admittances, comprising the step of directing electromagnetic waves into the earth along a series of traverses with an oscillator, the step of receiving the earth-modified electromagnetic waves with a detector, the step of maintaining a fixed distance and orientation between said oscillator and said detector during the taking of readings, the step of standardizing the sensitivity of a combination of said oscillator and said detector, the step of recording the readings of said detector whereby said readings may be correlated with an empirical curve showing the relation between mineral values in the earth underneath said traverses and said readings.

8. The method of determining the location and character of placer deposits, mineralized veins, or other bodies identified by anomalous electrical admittances, comprising the step of directing electromagnetic waves into the earth along a series of traverses with an oscillator, the step of receiving the earth-modified electromagnetic waves with a detector, the step of maintaining a fixed distance and orientation between said oscillator and said detector during the taking of readings, the step of standardizing the sensitivity of a combination of said oscillator and said detector, the step of recording the readings of said detector, and the step of correlating said readings with an empirical curve showing the relation between mineral values in the earth underneath said traverses and said readings.

9. The method of determining the location and character of geologic features, comprising the step of directing electromagnetic waves into the earth, the step of maintaining substantially constant the frequency of said waves, the step of maintaining substantially constant the energy in said waves, the step of making a series of measurements of the intensity of the earth-modified electromagnetic waves at a point in fixed spatial relation to the source of said electromagnetic waves as said source is moved from place to place, the step of measuring the intensity at a selected point under standard conditions, the step of making corrections in the said series of measurements as the measured intensity at said selected point under standard conditions is found to vary when last said measurement is made from time to time during the said series of measurements, the step of making a drift correction determined by the difference in the measured intensity under standard conditions at the beginning of the series and the measured intensity under standard conditions at the end of the series, the step of recording the corrected measurements of the series and the places at which the measurements were made and the step of correlating said corrected measurements in said series with an empirical curve showing the relation between said corrected measurements and mineral values in the earth beneath the places where measurements were made.

10. The method of determining the location and character of geologic features, comprising the step of directing electromagnetic waves into the earth, the step of maintaining substantially constant the frequency of said waves, the step of maintaining substantially constant the energy in said waves, the step of making a series of measurements of the intensity of the earth-modified electromagnetic waves at a point in fixed spatial relation to the source of said electromagnetic waves as said source is moved from place to place, the step of measuring the intensity at said fixed point under standard conditions, the step of making corrections in the said series of measurements as the measured intensity at said fixed point under standard conditions is found to vary when last said measurement is made from time to time during the said series of measurements, the step of making a drift correction determined by the difference in the measured intensity under standard conditions at the beginning of the series and the measured intensity under standard conditions at the end of the series, the step of recording the corrected measurements of the series and the places at which the measurements were made whereby said readings may be correlated with an empirical curve showing the relation between mineral values in the earth underneath said traverse and said readings.

11. In the method of determining the vertical distance from a reference datum to bed-rock, to the interface between geologic materials of different electrical admittances, or to electrically anomalous discrete bodies, the step of propagating electromagnetic waves from an oscillator, the step of receiving the earth-modified electromagnetic waves with a detector, the step of maintaining a fixed spatial combination between said oscillator and said detector, the step of varying the elevation of the oscillator-detector combination along a substantially vertical line, the step of determining the elevation of said oscillator-detector combination with respect to an arbitrary datum, and the step of recording the reading of said detector and the distance to said arbitrary datum for each of said elevations of said oscillator-detector combination.

WILLIAM M. BARRET.